(12) United States Patent
Lin

(10) Patent No.: US 7,048,565 B2
(45) Date of Patent: May 23, 2006

(54) CARD EDGE CONNECTOR

(75) Inventor: Tung-Chang Lin, Taipei Hsien (TW)

(73) Assignee: Molex Incorporated, Lisle, IL (US)

( * ) Notice: Subject to any disclaimer, the term of this patent is extended or adjusted under 35 U.S.C. 154(b) by 0 days.

(21) Appl. No.: 11/017,263

(22) Filed: Dec. 20, 2004

(65) Prior Publication Data

US 2005/0136724 A1 Jun. 23, 2005

(30) Foreign Application Priority Data

Dec. 19, 2003 (TW) .............................. 92222267 U

(51) Int. Cl.
*H01R 13/62* (2006.01)
(52) U.S. Cl. ..................................... 439/326
(58) Field of Classification Search ................ 439/326, 439/325, 92, 108
See application file for complete search history.

(56) References Cited

U.S. PATENT DOCUMENTS

| | | | | |
|---|---|---|---|---|
| 6,027,357 A | * | 2/2000 | Howell et al. .............. | 439/326 |
| 6,390,842 B1 | * | 5/2002 | Hashimoto .................. | 439/326 |
| 6,419,513 B1 | * | 7/2002 | Choy ......................... | 439/326 |
| 6,551,121 B1 | * | 4/2003 | Li et al. ..................... | 439/328 |
| 6,663,407 B1 | * | 12/2003 | Pickles ....................... | 439/328 |
| 6,726,499 B1 | * | 4/2004 | Yu ............................. | 439/328 |
| 6,817,875 B1 | * | 11/2004 | Chang et al. ............... | 439/159 |

\* cited by examiner

*Primary Examiner*—Tulsidas C. Patel
*Assistant Examiner*—Harshad Patel
(74) *Attorney, Agent, or Firm*—Robert J. Zeitler

(57) ABSTRACT

A card edge connector includes an insulating housing, a plurality of terminals, and two latches. The insulating housing has a main body and two lateral side frames. The terminals are mounted on the main body of the insulating housing. The two latches are individually mounted on a free end of two lateral side frames of the insulating housing. Each latch includes a main portion. The main portion is extended between two lateral side frames to be formed with a restrictive body, and extended along an outside face of two lateral side frames and formed with a resilient arm. A free end of the resilient arm is extended between the two restrictive bodies to be formed with a stopping plate. When the two lateral side frames are pulled outward by an external force, the two lateral side frames can individually push the resilient arm to move outward, to make the stopping plate of the free end of the resilient arm move outward and abut against the restrictive body for positioning, for limiting the outward movement of the two lateral side frames to prevent breakage or deformation of the lateral side frames.

8 Claims, 5 Drawing Sheets

CARD EDGE CONNECTOR

FIELD OF THE INVENTION

The present invention relates to a card edge connector, and particularly relates to a card edge connector disposed on a motherboard for electrically connecting a daughterboard.

BACKGROUND OF THE INVENTION

Referring to FIGS. 1 and 2, a conventional card edge connector, disposed on an upper surface of a motherboard, is disclosed. The card edge connector is used for receiving a daughterboard so as to electrically connect the motherboard.

The card edge connector includes an insulating housing 91, a plurality of terminals 92 and two latches 93. The insulating housing 91 includes a main body 911 and two lateral side frames 912 connecting the main body 911. The terminals 92 are arranged on the main body 911 of the insulating housing 91, and each of the terminals 92 has a soldering portion connecting to a pad of the motherboard for electrical connection. When the daughterboard is inserted between the two lateral side frames 912 of the insulating housing 91, the daughterboard electrically connects the terminals 92. Each of the two lateral side frames 912 has a buckling arm 913 formed at a free end thereof for resiliently locking the daughterboard.

The two latches 93 are disposed on the two lateral side frames 912, and made of the metallic materials. Each metallic sheath 93 has a main portion 931, which is shaped like U in order to match each lateral side frame 912. The main portion 931 extends forwards and a stopper 932 projecting upwardly is formed, so that the lateral sidewall of the main portion 931 and the stopper 932 restrain the outward and inward movement of the two lateral side frames 912, respectively.

However, the latches 93 of the conventional card edge connector are elongated, so that the sidewall of the main portion 931 of the two latches 93 cannot restrains the outward movement of the two lateral side frames 912 exactly when the daughterboard is ejected and the two lateral side frames 912 are moved outwardly so as to enable the buckling arm 913 to be removed from the daughterboard. The two lateral side frames 912 move outwardly and vibrate so much that it may lead to deformation or breakage of the two lateral side frames 912, which are made of plastic materials.

Hence, an improvement over the prior art is required to overcome the disadvantages thereof.

SUMMARY OF INVENTION

An object of the invention is to specify a card edge connector that can limit movement of the two lateral side frames in order to prevent the breakage or deformation of the two lateral side frames when the two lateral side frames are moved outwardly to release a daughtercard retained by the card edge connector latches.

According to the invention, the object is achieved by a card edge connector including an insulating housing, a plurality of terminals, and two latches. The insulating housing has a main body and two lateral side frames. The terminals are mounted on the main body of the insulating housing. The two latches are individually mounted on a free end of two lateral side frames of the insulating housing. Each latch includes a main portion. The main portion is extended between two lateral side frames to be formed with a restrictive body, and extended along an outside face of two lateral side frames and formed with a resilient arm. A free end of the resilient arm is extended between the two restrictive bodies to be formed with a stopping plate. When the two lateral side frames are pulled outward by an external force, the two lateral side frames can individually push the resilient arm to move outward, to make the stopping plate of the free end of the resilient arm move outward and abut against the restrictive body for positioning, for limiting the outward movement of the two lateral side frames to prevent breakage or deformation of the lateral side frames.

Additionally, the benefits of this invention may be applied to card edge connectors having a single lateral side frame and a single latch.

BRIEF DESCRIPTION OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE DISCLOSED EMBODIMENTS

Figures 1, 2:
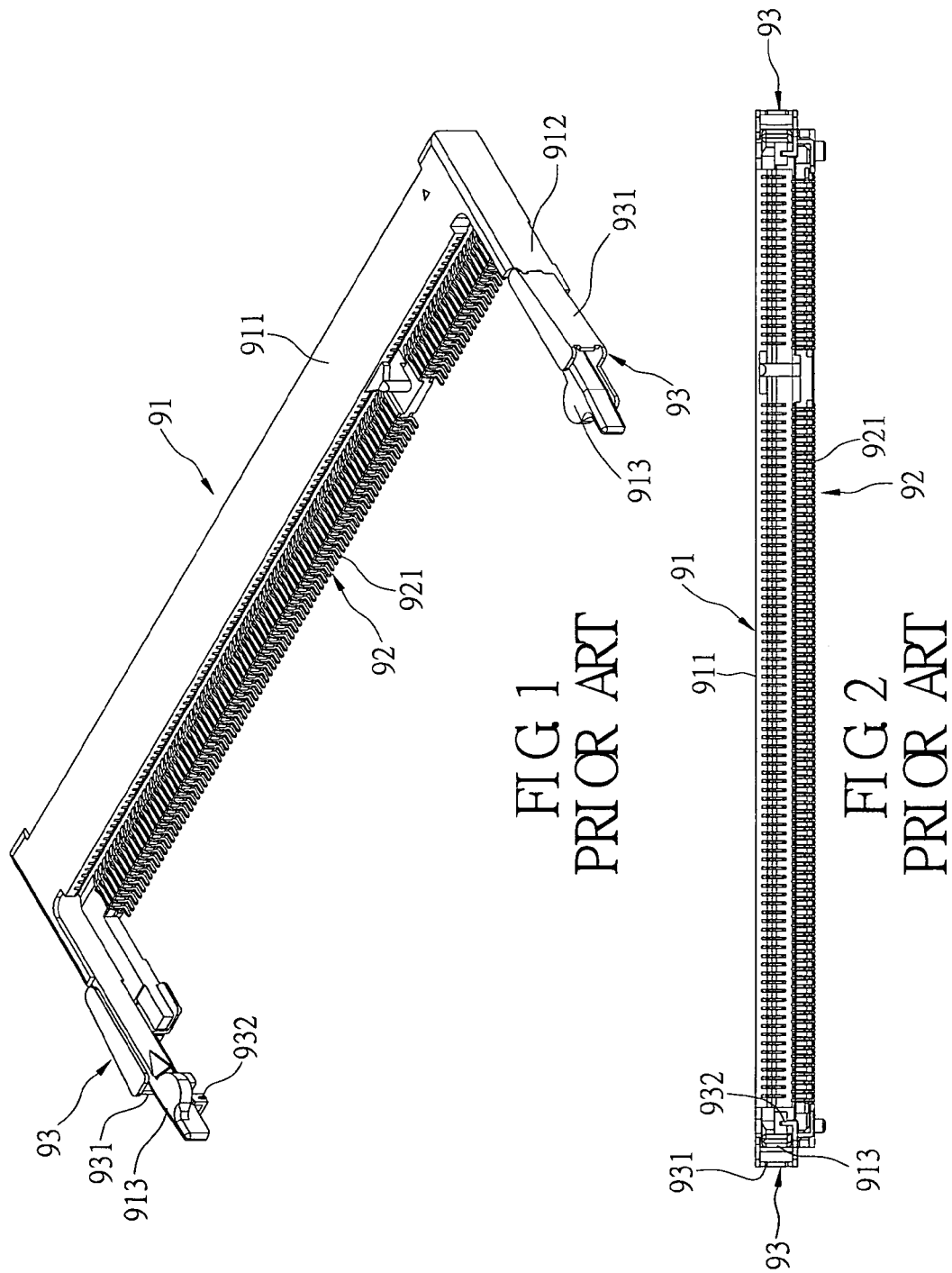
FIG. 1 is a perspective view of a conventional card edge connector.
FIG. 2 is a front view of the conventional card edge connector.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 3:
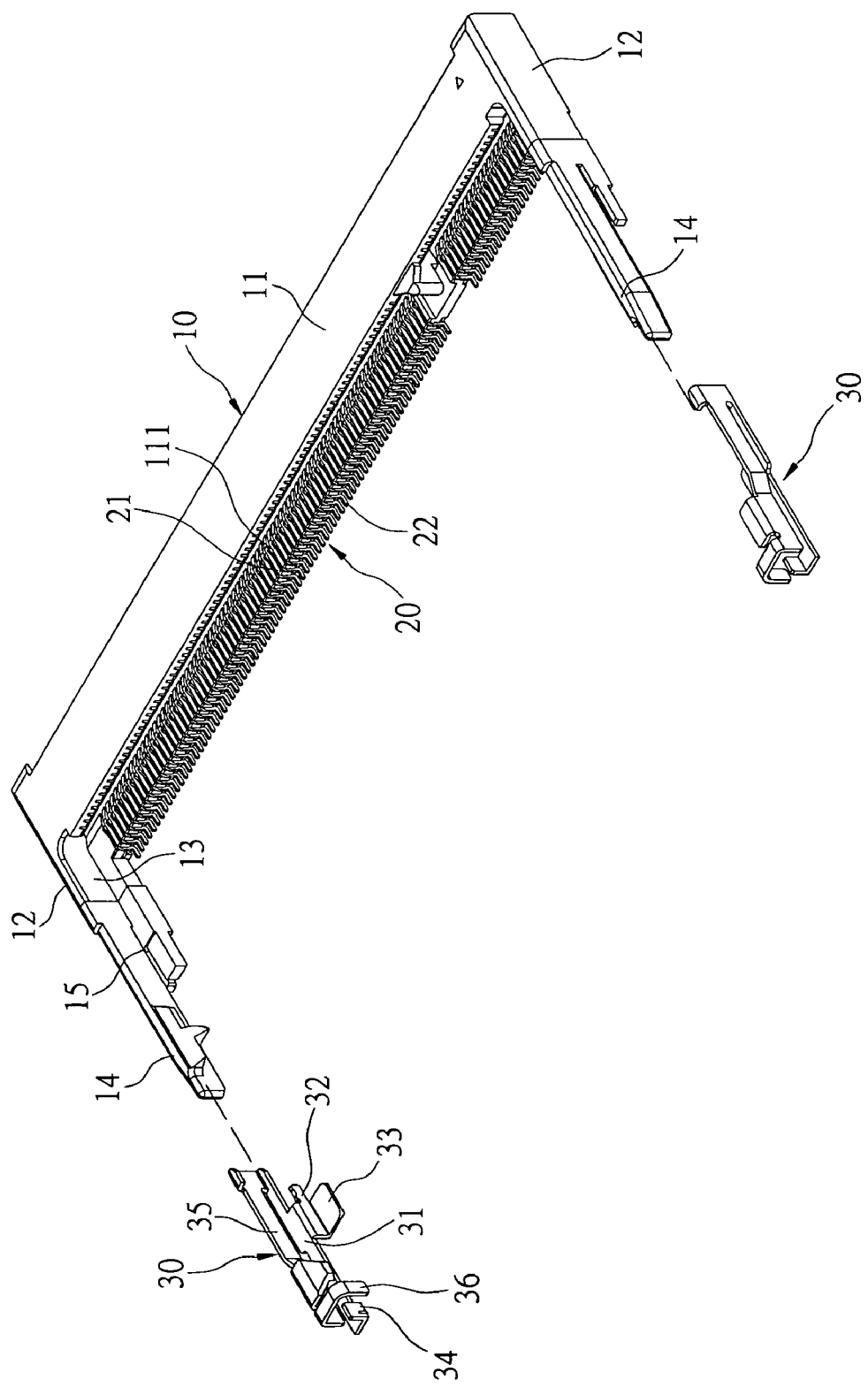
FIG. 3 is a decomposition view of a card edge connector according to the present invention.
Figures 4, 5:
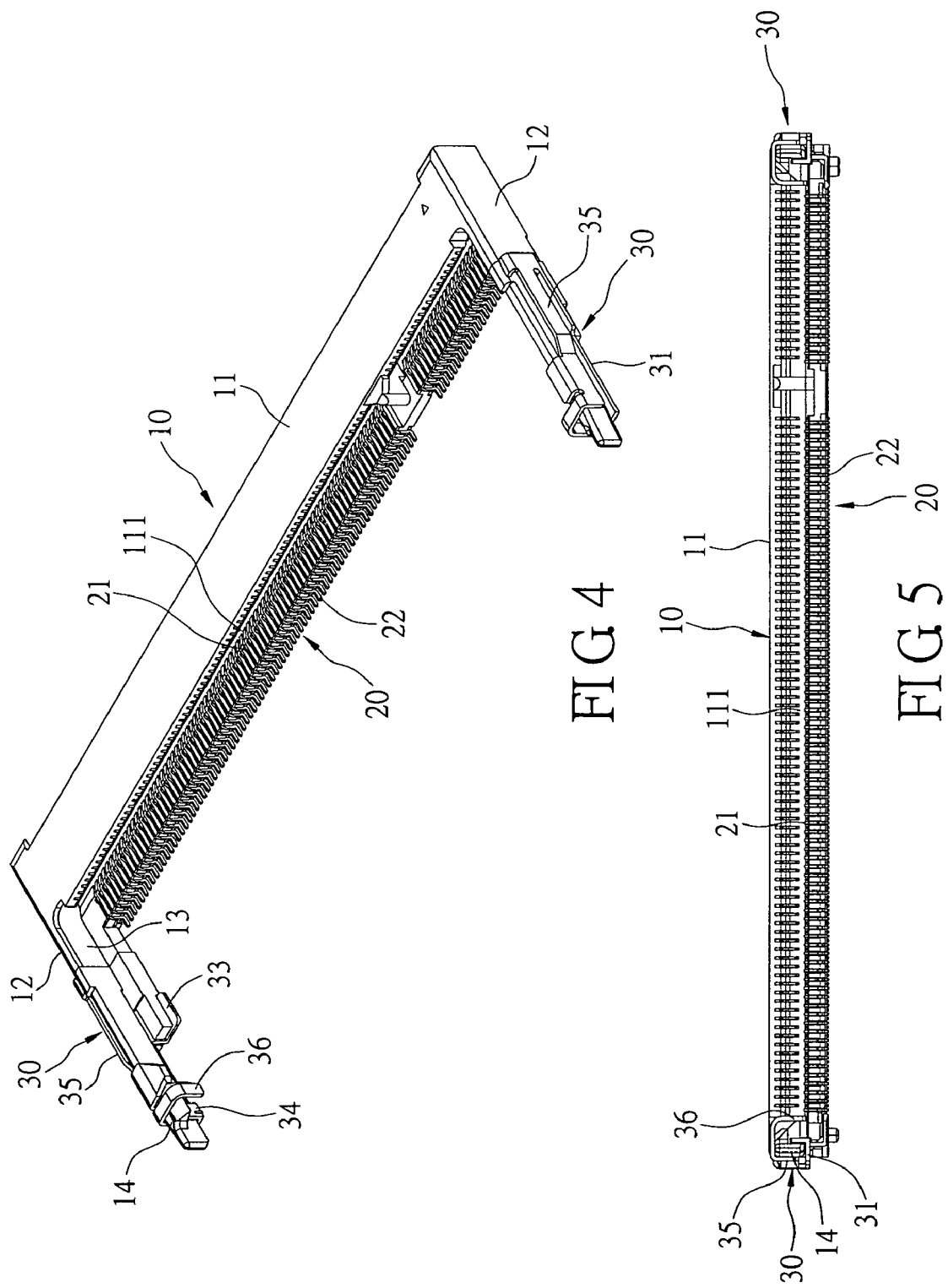
FIG. 4 is a perspective view of the card edge connector according to the present invention.
FIG. 5 is a front view of the card edge connector according to the present invention.

A card edge connector illustrated in FIGS. 3–5 according to the present invention is disposed on an upper surface of a motherboard for receiving and electrically connecting a daughterboard.

The card edge connector includes an insulating housing 10, a plurality of terminals 20 and two latches 30. The insulating housing 10 is made of plastic materials, and includes a main body 11 and two lateral side frames 12 connecting the main body 11. The main body 11 includes a reception opening 111, and the each side frame 12 has a slot formed along a longitudinal direction for guiding the daughterboard between the two lateral side frames 12 and for inserting the daughterboard into the reception opening 111. Each side frame 12 has a buckling arm 14 disposed on a free end thereof for securing the daughterboard resiliently.

The terminals 20 are disposed on the main body 11 of the insulating housing 10; each of the terminals 20 includes a contact portion 21 and a solder portion 22. The contact portion 21 is disposed inside the reception opening 111 of the insulating housing 11 for electrically connecting a pad of the daughterboard. The solder portion 22 extends outwardly from the main body 11 for soldering with a pad of the motherboard for electrical connection.

Figure 6:
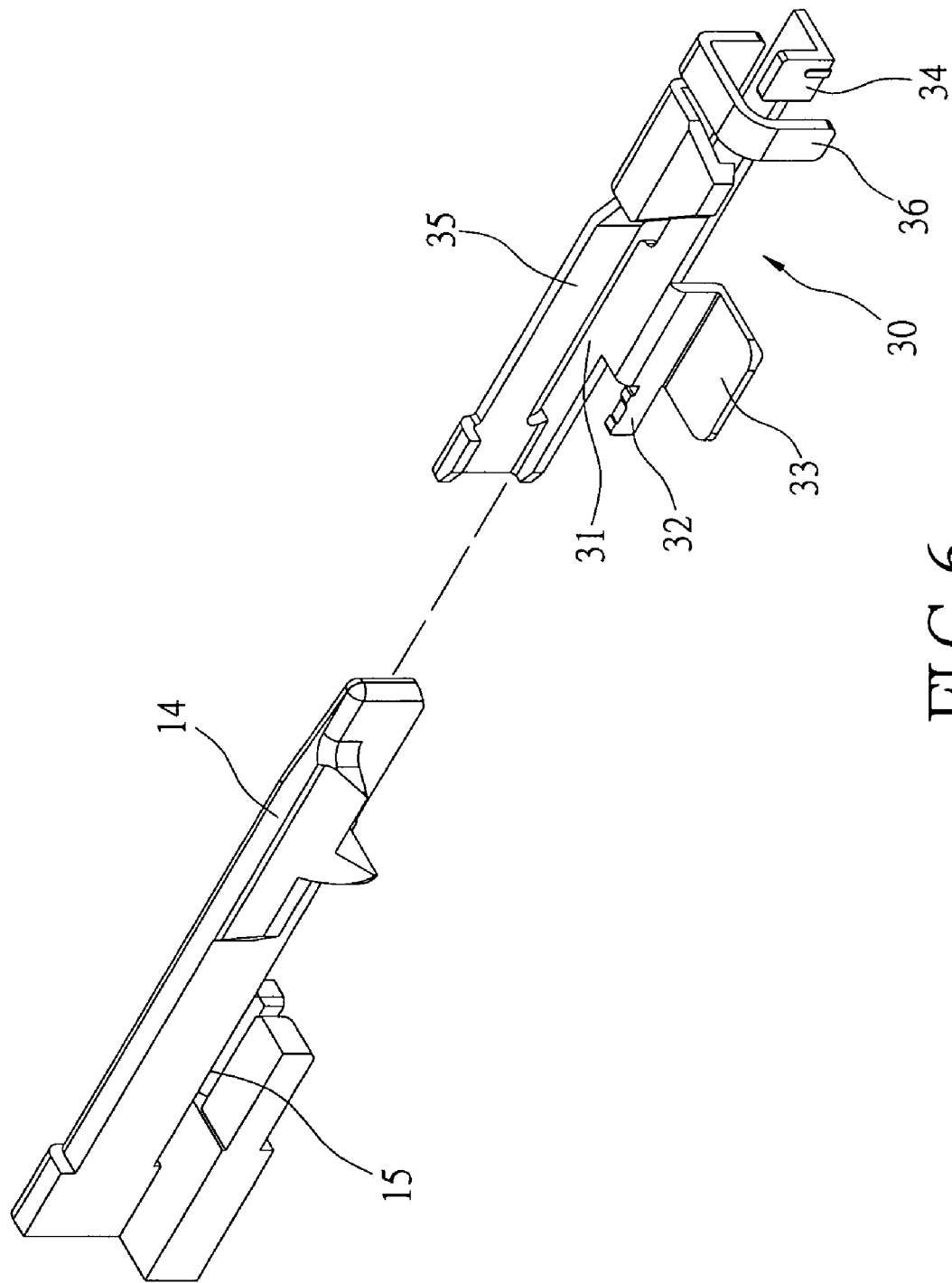
FIG. 6 is a decomposition view of a buckling arm and a latch according to the present invention.
Figure 7:
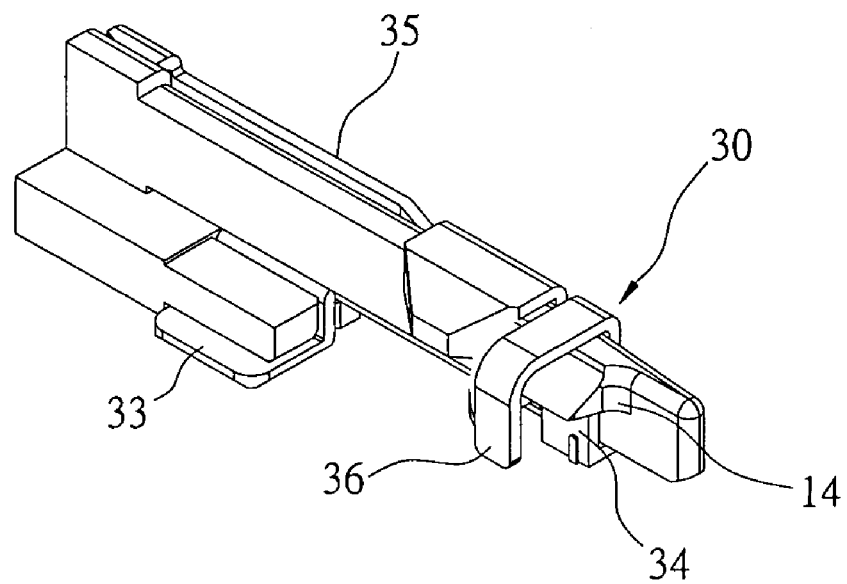
FIG. 7 is a perspective view of the buckling arm and the latch according to the present invention.
Figure 8:
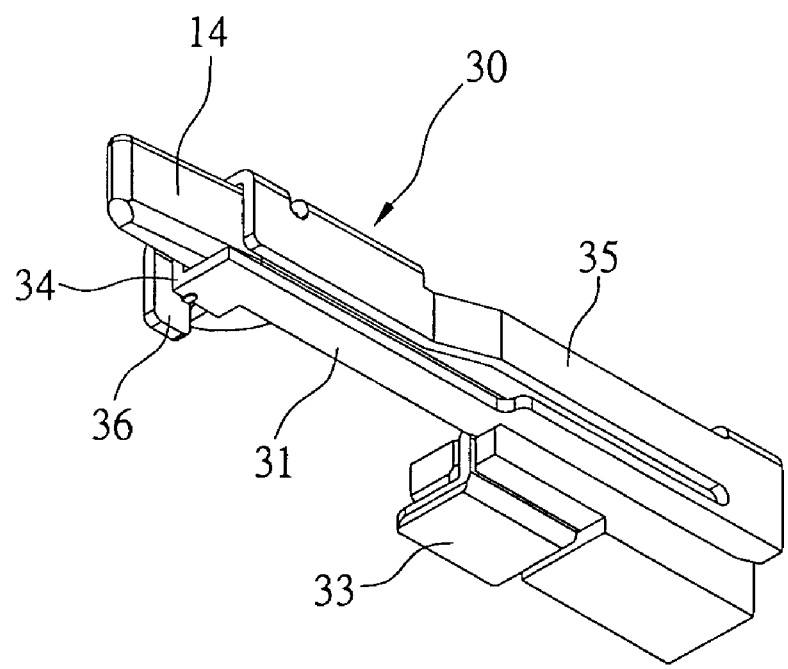
FIG. 8 is a perspective view of the buckling arm and the latch from another angle according to the present invention.

The latches 30 are individually mounted on a free end of two lateral side frames 12 of the insulating housing 10. The latches 30 are punched by metallic materials. Referring to FIGS. 6–8, each latch 30 includes a main portion 31, which is elongated. The main portion 31 has an orientation portion 32 extended from an inner side thereof so as to mate with an orientation slot 15 formed at each of the two lateral side frames 12 of the insulating housing 10 for securing the main portion 31 to the lateral side frame 12, and a solder portion 33 being horizontal, formed at low level and extended from an inner side thereof so as to connect to a motherboard.

The main portion 31 is extended inwardly between two lateral side frames 12 to be formed with a restrictive body 34, for restraining the inward trip of the side frame 12, and extended along an outside face of two lateral side frames 12 and formed with a resilient arm 35. The restrictive body 34 extends from a head of the main portion 31 and projects upwardly. The resilient arm 35 is disposed on a rear of the main portion 31 and has a free end capable of moving inwardly and outwardly. The free end of the resilient arm 35 is extended between the two restrictive bodies 34 to be formed with a stopping plate 36. The stopping plate 36 is folded inwardly from the free end of the resilient arm 35 and formed by further bending downwardly. And the stopping plate 36 is disposed at proper position of the restrictive body 34.

The solder portion 22 of each terminal 20 and the solder portion 33 of each latch 30 solder to the upper surface of the motherboard for electrical connection. When the daughterboard inserts into the reception opening 111 of the insulating housing 10, the solder portion 21 of each contact 20 electrical connects the daughterboard, so as to enable the daughterboard electrically connect the motherboard.

When the daughterboard is ejected, the two lateral side frames 12 can be moved outwardly to release the buckling arm 14, which has been secured the daughterboard. The two lateral side frames 12 push the resilient arms 35 outwardly in order to move the stopping plate 36 to abut against the restrictive body 34 for an orientation. Because the restrictive body 34 is an unmoved, secured structure, the stopping plate 36 can be orientated stably while abutting against the restrictive body 34. Therefore, the side frame 12 will not over extend in order to prevent breakage or deformation thereof since the side frame 12 is only capable of moving a distance dictated by the distance between the restrictive body 34 and the stopping plate 36.

While a preferred embodiment of the present invention is shown and described, it is envisioned that those skilled in the art may devise various modifications of the present invention without departing from the spirit and scope of the appended claims.

What is claimed is:

1. A card edge connector comprising:
   an insulating housing having a main body and at least on lateral side frame;
   a plurality of terminals mounted on the main body of the insulating housing; and
   a latch disposed on a free end of the lateral side frame of the insulating housing, the latch including a main portion, the main portion having a restrictive body extending away from the main portion, and a resilient arm which extends along an outside face of the lateral side frame, wherein the resilient arm has a stopping plate formed at a free end thereof and space from the restrictive body;
   whereby when the resilient arm is moved outward, the resilient arm is capable of moving outward until the stopping plate abuts against the restrictive body thereby limiting the outward movement of the lateral side frame when the lateral side frame is pulled outward by an external force.

2. The card edge connector as claimed in claim 1, wherein the main portion has an orientation portion extending from an inner side thereof so as to mate with an orientation slot formed in the lateral side frame of the insulating housing.

3. The card edge connector as claimed in claim 1, wherein the main portion has a solder portion extended from an inner side thereof, so as to connect to a motherboard.

4. The card edge connector as claimed in claim 1, wherein the restrictive body extends from a head of the main portion and projects upwardly.

5. The card edge connector as claimed in claim 1, wherein the stopping plate is folded inwardly from a free end of the resilient arm and formed by further bending downwardly.

6. The card edge connector as claimed in claim 1, wherein the insulative housing has two lateral side frames.

7. The card edge connector as claimed in claim 6, wherein each of the lateral frames include a latch.

8. The card edge connector as claimed in claim 6, wherein the insulative housing includes a main body, and wherein the main body is located between the two lateral side frames.

* * * * *